Sept. 15, 1964    M. U. BAGWELL    3,148,701
PIPE LINE VALVE POSITION INDICATOR
Filed July 16, 1962    3 Sheets-Sheet 3
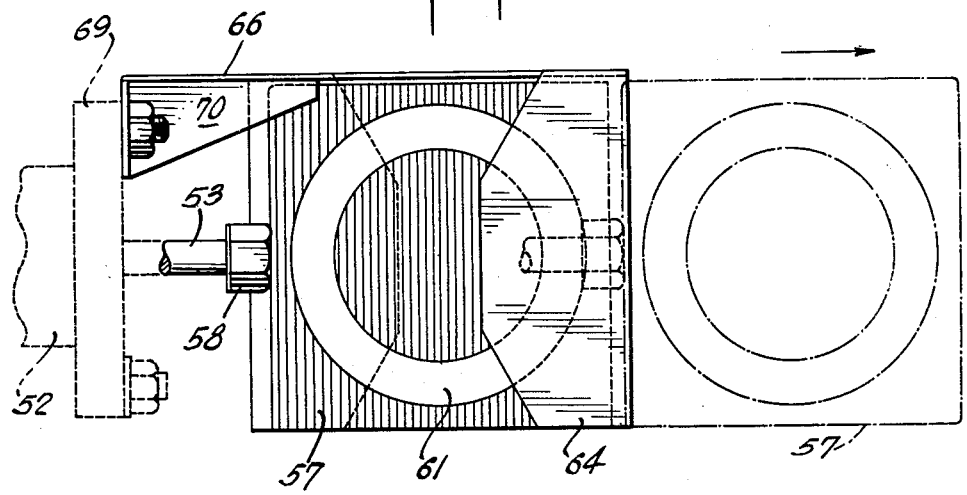
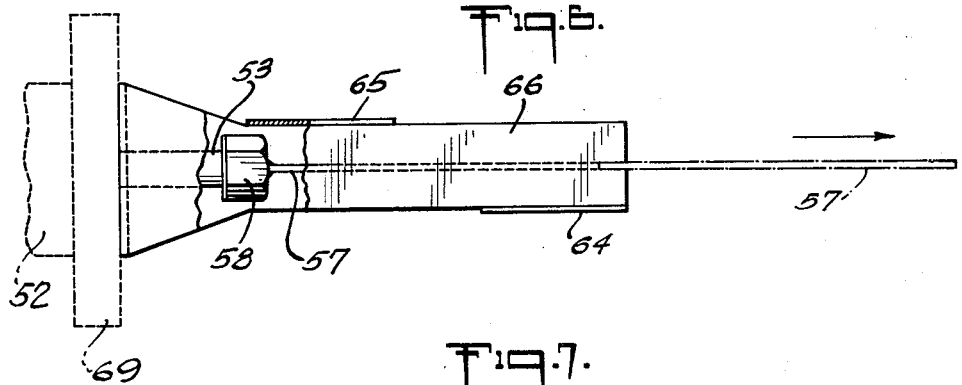
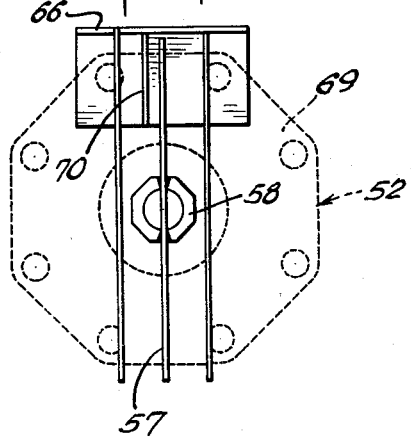

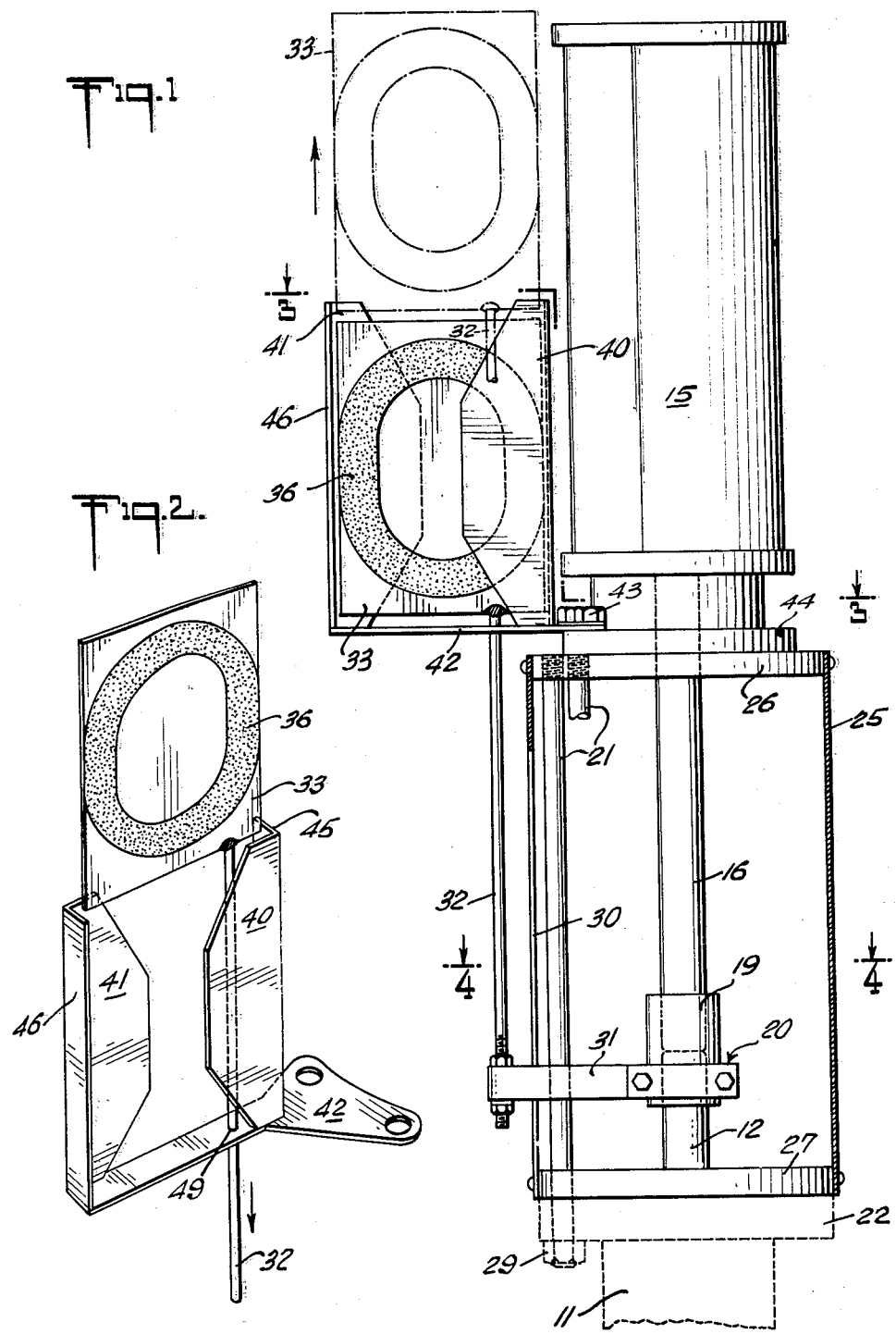

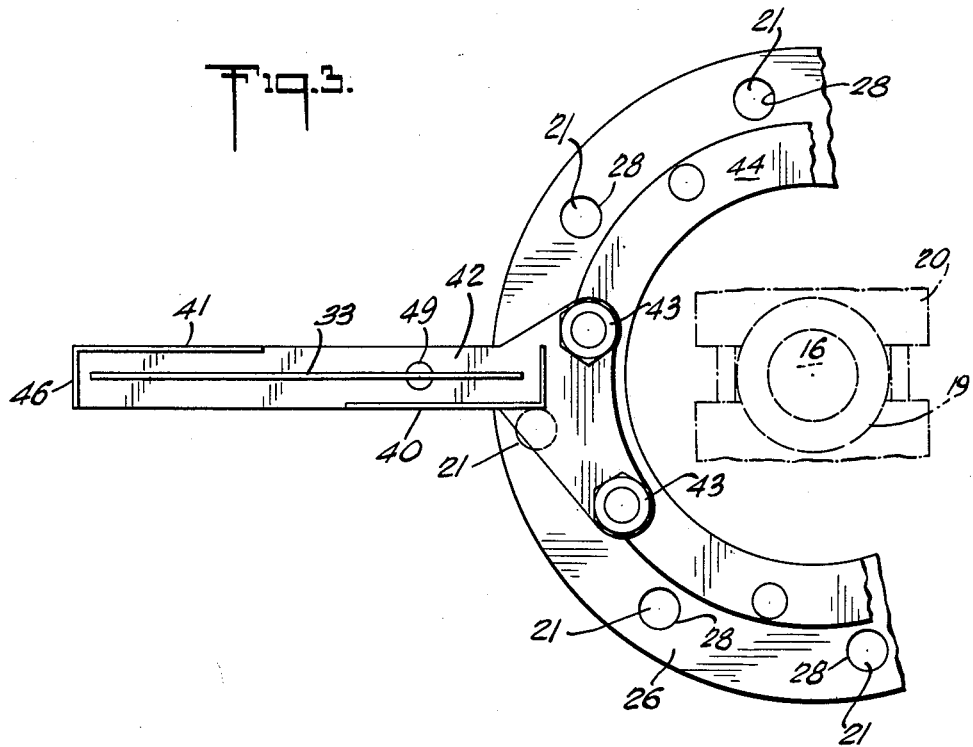
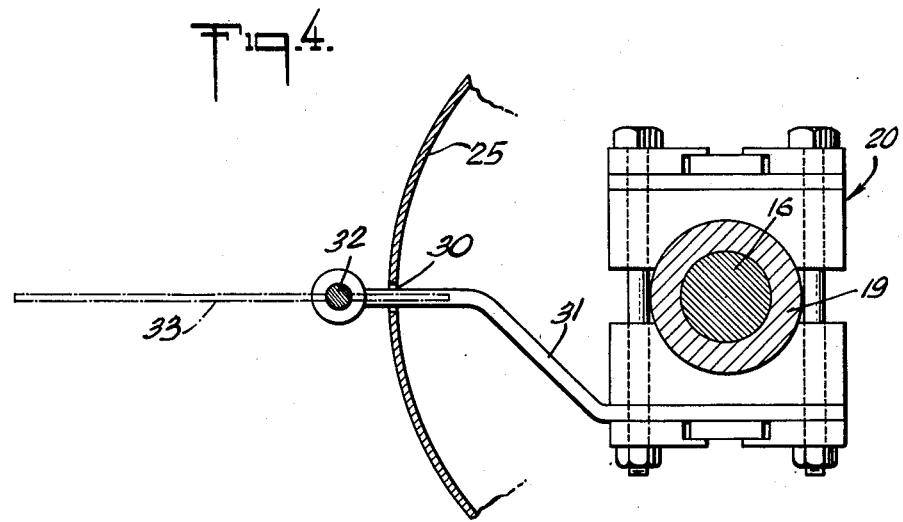

United States Patent Office 3,148,701
Patented Sept. 15, 1964

3,148,701
PIPE LINE VALVE POSITION INDICATOR
Marshall U. Bagwell, Houston, Tex., assignor to The Texas Pipe Line Company, Houston, Tex., a corporation of Texas
Filed July 16, 1962, Ser. No. 209,931
8 Claims. (Cl. 137—556)

This invention concerns pipe lines in general and more specifically deals with a position indicator for pipe line valves.

In connection with pipe line operations, the earlier procedure of checking on the right-of-way of a pipe line in order to inspect the facilities for leaks, damage, or impending damage used to be carried out by so-called line walkers. More recently the same service has been taken care of by employing a system of aerial patrols. Under the latter system a pilot in a light plane will fly above and along the pipe line right-of-way at a relatively low elevation. In this manner the pilot may visually inspect the right-of-way and any above ground facilities while making reports by radio or sometimes by dropping messages at manned locations. During such aerial inspection it is not practical or possible for the pilot to perform certain duties such as repair work or to make any closeup or detailed inspection of any of the facilities.

Most pipe lines employ a substantial number of gate valves at various locations along their routes. These valves may be located on the main line or on connecting lateral lines in manifold installations. Likewise, many gate valves are employed in connection with pumping stations. Oftentimes, such gate valves are located in isolated locations where no operating personnel is close by.

While some of the above mentioned valves are manually operated, many are operated remotely by electrical, hydraulic or pneumatic means. The valves that are thus remotely operated may have the position of each valve monitored by remote position indicators of some sort; but, in spite of this it is necessary and prudent to periodically check the control apparatus so as to insure that it is functioning properly and that the valves are in the indicated positions at all times. Heretofore, a positive check of this sort could only be obtained by a person visiting the location to make such check and then returning to some operating base or telephone in order to relay the information to a desired central location.

In view of the foregoing it is an object of this invention to provide for a reduction in the amount of time and labor required to make a positive determination with respect to valve positions in isolated gate valve installations.

Another object of this invention is to provide a valve position indicator that is especially adaptable for pipe line operations and provides a visual indication that is clearly observable from aircraft and the like.

Briefly, the invention concerns a pipe line valve position indicator which will provide visual indication that is clearly observable from aircraft and the like. The indicator comprises a gate valve having an operator wherein said operator is translated over a predetermined distance as the said gate valve moves from closed to open position. The invention additionally comprises flat means for displaying a symbol on both sides thereof which has one dimension at least substantially equal to the said predetermined distance. The invention additionally comprises means for masking part of said symbol on opposite sides thereof when the gate is in one of its terminal positions, and means for translating said flat means relative to said masking means as the said operator is translated over said predetermined distance, whereby said symbol is displayed unmasked when the valve is in one of its terminal positions and masked when in the other.

Again briefly the invention (which concerns a pipe line valve position indicator for providing visual indication clearly observable from aircraft and the like) comprises a combination which includes a gate valve having an operator therefor. The said operator being translated over a predetermined distance as said gate moves from closed to open position. The combination also comprises a first plate having one dimension at least substantially equal to the said predetermined distance and having the letter O on both sides thereof and in addition having second and third plates located on opposite sides of the first plate for masking part of the letter O to present a letter C. The letter O that is employed has a color that has sharp contrast with the background. The said first plate is connected to the operator of the valve for movement therewith while the second and third plates are fixed.

The foregoing and other objects and benefits of the invention will be more fully appreciated in connection with the detailed description of preferred embodiments that are set forth below and that are illustrated in the drawings, in which:

FIGURE 1 is a side elevation illustrating one modification wherein the gate valve is situated in a vertical position, i.e. with respect to the stem or operator thereof;

FIGURE 2 is a perspective illustrating the indicator elements per se, according to the FIGURE 1 modification;

FIGURE 3 is a plan view taken along the lines 3—3 of FIGURE 1;

FIGURE 4 is another plan view, partly in cross section, taken along the lines 4—4 of FIGURE 1;

FIGURE 5 is a side elevation illustrating a different modification wherein the gate valve is situated on its side i.e. with the stem thereof lying horizontal;

FIGURE 6 is a plan view partly broken away in cross section showing the modification illustrated in FIGURE 5; and FIGURE 7 is an end elevation of the modification illustrated in FIGURE 5.

Referring to FIGURES 1-4 there is illustrated an indicator according to the invention that is applicable for use with a gate valve 11 situated vertically so that a stem 12 thereof stands upright and moves vertically with the opening and closing movements of the gate (not shown) in the valve 11. There is a valve operator 15 that is situated above the body of valve 11 and may be any of a number of remotely or locally controlled operator units that are commercially available. The operator 15 has a rod 16 that extends vertically below the body of the operator and that may be connected to the valve stem 12 in any feasible manner such as by being clamped in alignment therewith by a collar 19 that has a bolted clamp 20 fastened thereover.

It will be observed that the operator 15 is structurally supported on top of valve 11 by an enclosed ring of support rods 21 that are fastened to and extend through a flange or collar 22 of the valve 11. An enclosing housing sheath 25 surrounds the rods 21 and is fastened in any feasible manner to a pair of upper and lower plates 26 and 27 respectively that are associated with the ring of rods 21. The rods 21 are fastened to the upper plate 26 by being threadably received in a correponding set of holes 28 in the plate 26. While at the lower end of the rods they may pass through the lower plate 27 and the flange 22 with a collar (not shown) or reduced diameter arrangement so that vertical support is given to the rods. The lower ends of the rods are held in place by having nuts 29 threaded on below the flange 22.

There is a vertically extending slot 30 in the sheath 25, to accommodate a transversely extending arm 31 that is attached firmly to the clamp 20 for movement vertically therewith. Attached to the extremity of arm 31 there is a vertically extending supporting rod 32. Rod 32 has attached at the upper end thereof a flat plate 33 which carries on both sides thereof a symbol 36 in the form of a large O that is preferably painted or otherwise constructed of a sharply contrasting color relative to its background, e.g. an international orange color. For making a maximum contrast the background of both faces of plate 33 may be coated with a white paint.

Plate 33 is constructed of sufficiently stiff material so that it is self-supporting by means of a single attachment to the top of rod 32. Such attachment may be made in any feasible manner, e.g. by having rod 32 welded to the plate 33.

There is a masking structure that includes two plates 40 and 41 situated parallel to but spaced sufficiently from the plate 33 to provide for adequate clearance in the operation of the indicator. Both plates 40 and 41 are supported on a transversely extending bracket 42 that is fastened in any convenient manner to part of the structure that supports valve operator 15, e.g. by being bolted under the heads of two of a ring of fasten down bolts 43 which pass through a flange 44 on the operator 15 and are threaded into holes in the upper plate 26. Each of the plates 40 and 41 has a short right angle edge portion 45 and 46 respectively that lends stiffness and provides end panels of a housing-like structure that receives the plate 33 when the operator 15 and valve 11 are in the valve-closed position, such that plate 33 is in its lowest or "closed" indicating position.

It will be observed that when the valve is closed and consequently the plate 33 is in its lowest position (situated with plates 40 and 41 overlapping part of each face thereof), the plates 40 and 41 act to mask the symbol O (36) on each side thereof, so as to transform it into a letter C. In order to facilitate this action, the upper and lower portions of plates 40 and 41 are cut off across each corner so as to allow additional curvature of the symbol O to be exposed and thus provide a visual presentation that is more clearly in the form of a letter C.

By referring to FIGURE 2, it will be observed that when the valve is in its open position such that valve stem 12 (FIGURE 1) is fully extended vertically upward, plate 33 will be raised up substantially clear of the masking plates 40 and 41 to fully expose the symbol O (36) that is on both sides of the plate 33. It will be observed also that there is a hole 49 through the bracket 42 in order to accommodate rod 32 and also to provide support which eliminates excessive vibration or whipping action of the rod 32.

It is pointed out that the structure of the indicator insofar as the size of the plate 33 is concerned, is such that the longitudinal dimension is at least substantially as large as (or equal to) the distance that the stem 12 of the valve is translated as the valve 11 is actuated from closed to open position and the reverse. By reason of this construction, the symbol can be made large enough to render the observation thereof easy and sure from the distance and short times involved in aircraft type observations.

Referring to FIGURES 5, 6 and 7, there is illustrated another embodiment in accordance with the invention. This embodiment is applicable to the situation where a gate valve 52 is situated horizontally, i.e. on its side, so that a stem 53 or other member that is connected for movement with the gate (not shown) of the valve 52, is situated in a horizontal position. The stem 53 is fully retracted, or situated in the position illustrated in FIGURE 5, when the valve 52 is in its closed position.

In this embodiment there is a first indicator plate 57 that is attached to the end of stem 53. Such attachment may be made in any feasible manner, e.g. by means of a hexagonal nut 58 threaded on the end of the stem 53 while the nut 58 is welded to the edge of plate 57.

On both faces or sides of the plate 57 there is a symbol 61 that is in the form of an O, although in this instance the O is represented by a circular band. Here again (as was the case in the above described modification) the body or band of the letter O in each case, is preferably formed with the use of a bright colored material placed on a highly contracting background.

In this horizontal modification, the masking structure is created by a pair of parallel plates 64 and 65. These masking plates are supported hanging vertically from a horizontally extending bracket 66, that is in turn attached in any feasible manner to the structure of the valve 52, e.g. by being bolted to a flange 69 thereof. In order to lend adequate vertical support to the main body of bracket 66, there is a vertical gusset 70.

It will be observed that in connection with the modification illustrated in FIGURES 5–7 the valve stem 53 will be situated in its most contracted position, i.e. like that illustrated in full lines, when the valve is closed. Thus, at this time the plate 57 is situated so that it is masked (from any side view thereof) by means of the masking plates 64 and 65, and the symbol O on the plate 57 will be transformed by the masking effect of the plates to appear like a C which stands for "closed." As in the first described modification, the plates 64 and 65 are shaped by cutting off the upper and lower corners of each in order to increase the curvature of the symbol 61 that is visible when in its masked state.

Of course, when the valve is open the stem 53 will be fully extended and the plate 57 (with symbol 61 thereon) will stand fully exposed, as illustrated by the dashed lines in FIGURES 5 and 6. Thus, the indicator will provide a visual symbol O standing for "open," when the valve is in such position.

It will be appreciated that various details of structural modification might be made. For example, instead of having a symbol painted on a backing plate or the like, the structure might be that of a cut out symbol being directly fastened for operation with the valve stem or other element that moves as the operator actuates the valve. However, in such case the color of the symbol structure itself should be chosen for maximum contrast with the surroundings at the location of the valves in question.

It is pointed out that although the operators illustrated and described were indicated as being the power type, it would be within the scope of this invention to apply an indicator to a manually operated valve.

While certain embodiments of the invention have been described above in considerable detail in accordance with the applicable statutes, this is not to be taken as in any way limiting the invention but merely as being descriptive thereof.

I claim:

1. A pipe line valve position indicator for providing visual indication clearly observable from aircraft and the like, comprising a gate valve having an operator, said operator being translated over a predetermined distance as said gate moves from closed to open position, flat means for displaying a symbol on both sides thereof having one dimension corresponding to the direction of said operator translation and at least substantially equal to said predetermined distance, means for masking part of said symbol on opposite sides thereof when the gate is in one of its terminal positions, and means for translating said flat means relative to said masking means as said operator is translated over said predetermined distance whereby said symbol is displayed unmasked when the valve is in one of its terminal positions and masked when in the other, said symbol having a configuration such that the unmasked configuration thereof is distinctly different from the masked configuration.

2. The invention according to claim 1 wherein said symbol is an O, and wherein said masking means has dimensions such that said O becomes a C when masked, and wherein said valve is in its closed position when said symbol is masked.

3. The invention according to claim 2 wherein said flat means comprises a first plate having said O on both sides thereof, and wherein said masking means comprises second and third plates on opposite sides of said first plate.

4. The invention according to claim 3 wherein said O is a color having sharp contrast with the background thereof.

5. The invention according to claim 4 wherein said color is orange and said background is white.

6. The invention according to claim 5 wherein said first plate is connected to said operator for movement therewith, and wherein said second and third plates are fixed.

7. The invention according to claim 6 wherein said operator is translated vertically.

8. The invention according to claim 6 wherein said operator is translated horizontally.

References Cited in the file of this patent
UNITED STATES PATENTS

| | | |
|---|---|---|
| 580,252 | Christie | Apr. 6, 1897 |
| 783,447 | Meloon | Feb. 28, 1905 |
| 804,413 | King | Nov. 14, 1905 |